United States Patent
Runbeck et al.

(10) Patent No.: US 11,030,398 B2
(45) Date of Patent: Jun. 8, 2021

(54) BALLOT DUPLICATION SYSTEM AND METHODS THEREOF

(71) Applicant: Runbeck Election Services Inc., Tempe, AZ (US)

(72) Inventors: Kevin Runbeck, Tempe, AZ (US); William O'Neill, Tempe, AZ (US); Chris Schiffhauer, Tempe, AZ (US); Sergei Nosov, Tempe, AZ (US); Akasha Ramnarine, Tempe, AZ (US)

(73) Assignee: RUNBECK ELECTION SERVICES INC., Tempe, AZ (US)

( * ) Notice: Subject to any disclaimer, the term of this patent is extended or adjusted under 35 U.S.C. 154(b) by 0 days.

(21) Appl. No.: 16/377,016

(22) Filed: Apr. 5, 2019

(65) Prior Publication Data

US 2019/0311030 A1    Oct. 10, 2019

Related U.S. Application Data

(60) Provisional application No. 62/653,012, filed on Apr. 5, 2018.

(51) Int. Cl.
| | | |
|---|---|---|
| *G06F 40/186* | (2020.01) | |
| *G07C 13/00* | (2006.01) | |
| *G06K 9/00* | (2006.01) | |
| *G06F 40/106* | (2020.01) | |

(52) U.S. Cl.
CPC .......... *G06F 40/186* (2020.01); *G06F 40/106* (2020.01); *G06K 9/00449* (2013.01); *G07C 13/00* (2013.01); *G06K 2209/01* (2013.01); *G06Q 2230/00* (2013.01)

(58) Field of Classification Search
CPC . G06F 40/186; G06F 40/106; G06K 9/00449; G07C 13/00
USPC ........................................................ 715/222
See application file for complete search history.

(56) References Cited

U.S. PATENT DOCUMENTS

| | | | | |
|---|---|---|---|---|
| 7,911,660 | B2 * | 3/2011 | Poor | G06K 17/0032 358/474 |
| 8,261,985 | B2 * | 9/2012 | Chung | G07C 13/00 235/386 |
| 2004/0169077 | A1 * | 9/2004 | Petersen | G07C 13/00 235/386 |
| 2008/0239331 | A1 | 10/2008 | Runbeck | |
| 2010/0252628 | A1 * | 10/2010 | Chung | G07C 13/00 235/386 |

OTHER PUBLICATIONS

International Search Report and Written Opinion in corresponding Application No. PCT/US2019/026148 dated Jun. 20, 2019, 8 pages.

* cited by examiner

*Primary Examiner* — Stephen S Hong
*Assistant Examiner* — Broderick C Anderson
(74) *Attorney, Agent, or Firm* — Polsinelli PC

(57) ABSTRACT

A computer-implemented system for on-screen ballot duplication is disclosed, that may be deployed for generating a revised ballot that satisfies predetermined rules or thresholds for further processing.

20 Claims, 14 Drawing Sheets
(7 of 14 Drawing Sheet(s) Filed in Color)

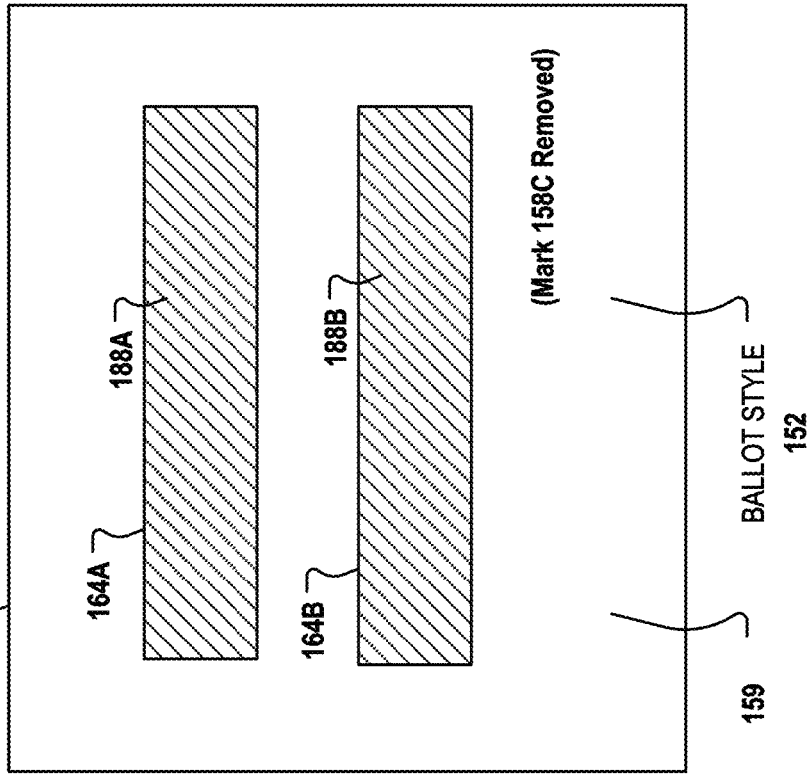

Generate an "Election" to process ballot images

Configure/Import ballot styles

Map the Ballot/s

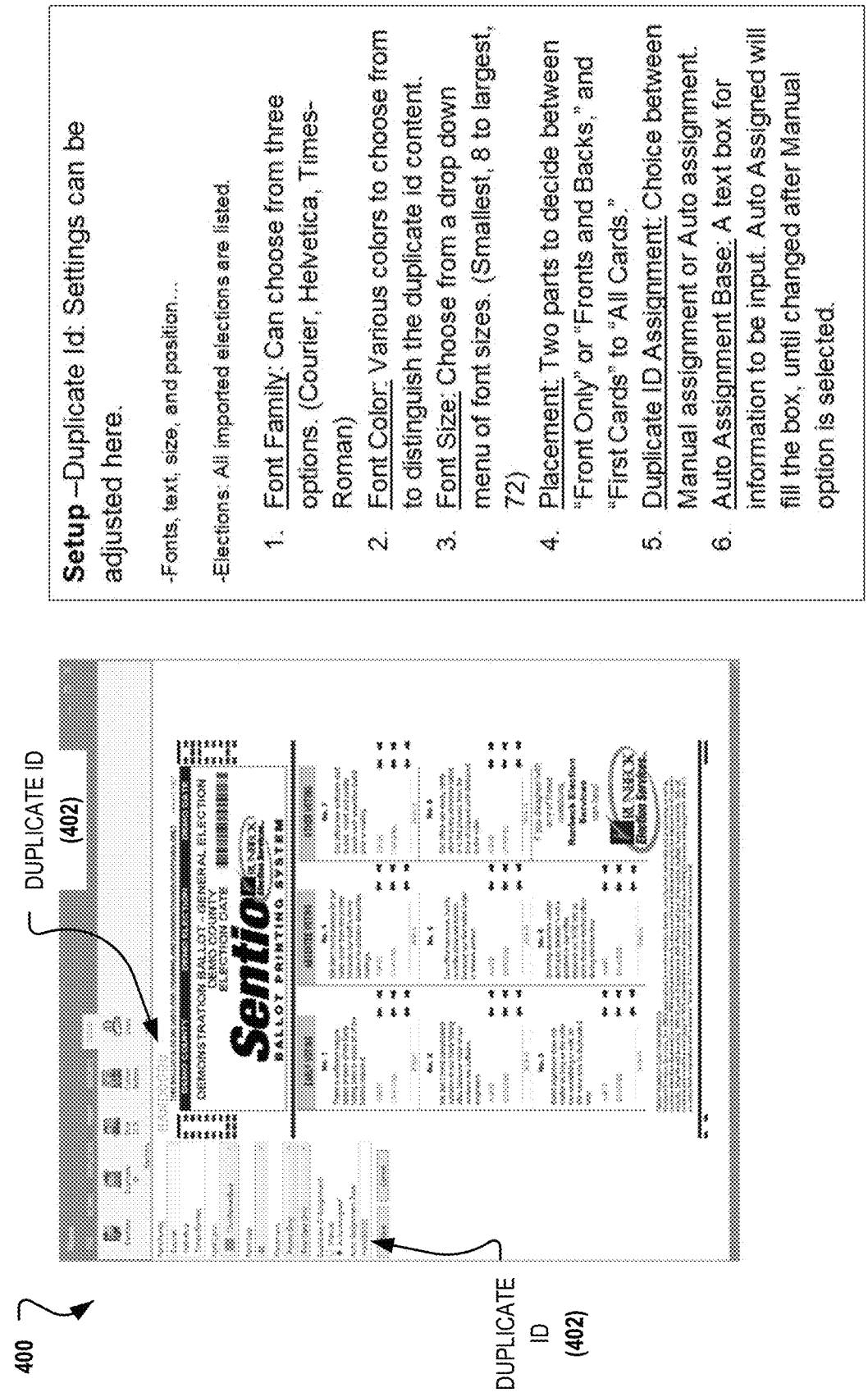
FIG. 4D Configure the Duplicate ID

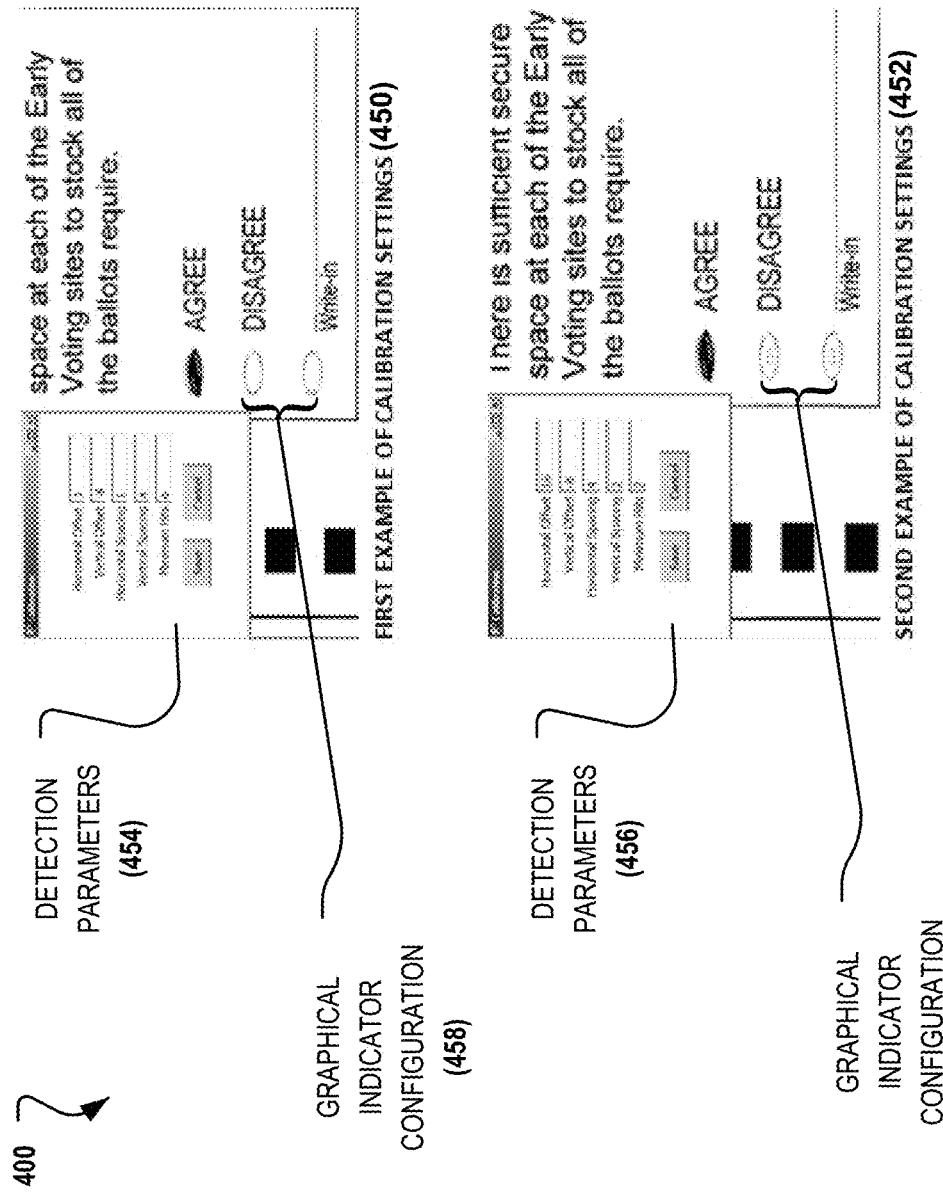

BALLOT DUPLICATION SYSTEM AND METHODS THEREOF

CROSS REFERENCE TO RELATED APPLICATIONS

This is a U.S. non-provisional patent application that claims benefit to U.S. provisional patent application Ser. No. 62/653,012 filed on Apr. 5, 2018, which is incorporated by reference in its entirety.

FIELD

The present disclosure generally relates to a computer-implemented system for elections services; and in particular, relates to a computer-implemented system for ballot duplication.

BACKGROUND

During elections, processing of elections documents must be conducted in an efficient yet highly accurate manner. However, during elections, documents such as ballots may become damaged at the site of a polling location or through transfer of the documents by mail, or ballots may include markings that are inadvertently applied or incapable of being interpreted.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

FIGS. 3A-3C are simplified block diagrams illustrating an original scanned ballot image, a duplicate ballot image, and a revised duplicate ballot image, respectively, as described herein.

FIGS. 4A-4F are application screenshots illustrating functionality associated with the computer-implemented system described herein.

Corresponding reference characters indicate corresponding elements among the view of the drawings. The headings used in the figures do not limit the scope of the claims.

DETAILED DESCRIPTION

Figure 1A:
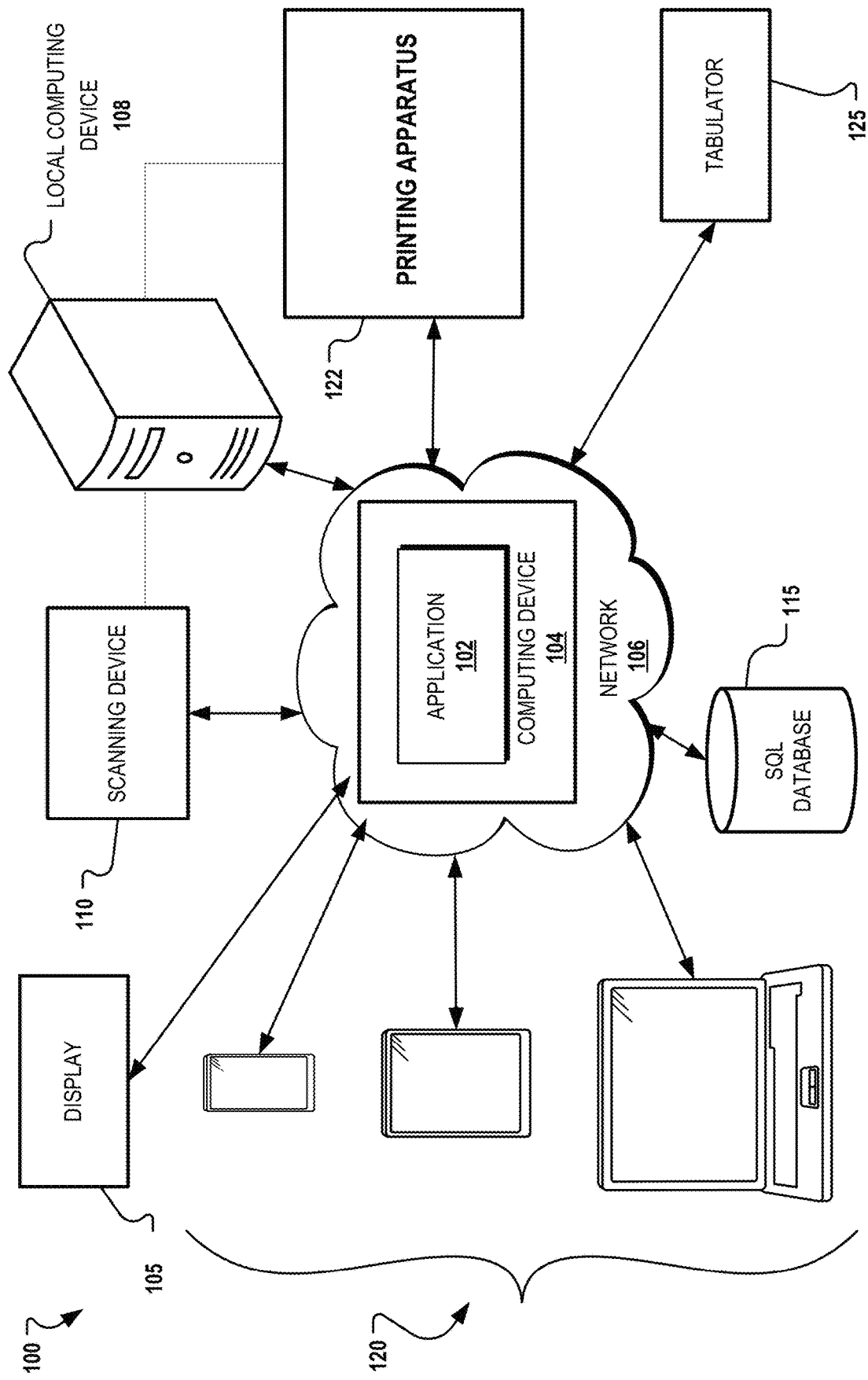
FIG. 1A is a network diagram illustrating possible components of an exemplary computer-implemented system for ballot duplication and processing.

The present disclosure generally relates to a computer-implemented system including at least one computing device configured for managing aspects of election services; and more particularly, to a computer-implemented system for ballot duplication and/or preparation/revision of ballots so that ballots, which include incomplete/erroneous markings or are otherwise incapable of processing for whatever reason, can be tabulated or processed by an elections center. In some embodiments, an original marked ballot is scanned to generate an original ballot image, and a ballot style identifier may be accessed from the original ballot image. The original ballot image may then be used to generate a duplicate image which generally includes a graphical depiction of an empty ballot having the same ballot style as the original marked ballot, which may be displayed on-screen alongside the original ballot image for further processing. In particular, referencing data defined by the ballot style common to the duplicate image and the original ballot image, the system may be used to identify and interpret marks (e.g., selections by a voter) from the original marked ballot (reflected by physical ink markings applied along the original marked ballot). In some embodiments, the marks are highlighted, identified, and possibly confirmed as valid markings using a series of graphical indicators which may comprise dots or other indicators associated with areas of interest along the image of the original scanned ballot as defined by the ballot style. The valid markings may then duplicated, applied to, or rendered along the duplicate image in a format that can be interpreted by a tabulator when a physical copy of the duplicate image is printed. The system may also identify erroneous markings along the original ballot image and omit the erroneous markings from the duplicate image.

In some embodiments, the ballots and ballot images may include a Duplicate Identifier ("ID") that is applied to the original ballot image and also to the duplicate image. The orientation, position, and form of the Duplicate ID can be adjusted and modified to meet desired specifications for ballots specific to certain jurisdictions. In some embodiments, the marks and actions taken involving the marks may be viewed on-screen via one or more displays. Further, the duplicate image may be reviewed and further edited prior to printing. Further still, the computer-implemented system may be applied to generate print instructions for printing a physical ballot copy of the revised duplicate image for further processing and possible acceptance by an elections office. Referring to the drawings, one embodiment of a computer-implemented system is illustrated and generally indicated as 100 in FIGS. 1-6.

Referring to FIG. 1A, an exemplary computer-implemented system (hereinafter "system" and other times referred to herein and in the Drawings as "Novus") 100 for implementing functionality associated with ballot duplication and preparation/revision for further processing, is shown. The system 100 may include and/or generally support functionality defined by one or more of an application 102, which, when installed to or executed by a computing device 104, configures the computing device 104 to process an original ballot image and generate a duplicate ballot image, and provide other functionality as described herein. The application 102 may be executed or accessed via one or more of the computing device 104, which may include a server, controller, a personal computer, a terminal, a workstation, a portable computer, a mobile device, a tablet, a mainframe, or other such computing device. Further, aspects of the application 102 may be outputted to and/or involve a display device 105 as described herein.

The computing device 104 may be configured for administering and providing access to aspects of the application 102 via a network 106, which may include the Internet, an intranet, a virtual private network (VPN), and the like. In some embodiments, a cloud (not shown) may be implemented to execute one or more components of the system 100. In addition, aspects of the system 100 and/or the application 102 may be provided using platform as a service (PaaS), and/or software as a service (SaaS) using e.g., Amazon Web Services, or other distributed systems.

As further shown, aspects of the application 102 may be accessible to a local computing device 108. The local computing device 108 may include a server workstation with at least one server, a controller, a personal computer, a terminal, a workstation, a portable computer, a mobile device, a tablet, a mainframe, or other such computing device. In some embodiments, the local computing device 108 may be associated with and may be generally located at a specific jurisdiction or elections center, such as a particular voting precinct that is responsible for e.g., generating, distributing, and managing ballots, and generating and transferring data about the ballots. In some embodiments, the local computing device 108 may form part of the overall system 100 as shown (e.g., where the local computing device 108 is deployed to the particular voting precinct). In other embodiments, the local computing device 108 may simply be any device executed by an end-user for accessing and utilizing aspects of the application 102, or otherwise receiving information outputted from the computing device 104 executing the application 102 and generated in response to information fed by the local computing device 108.

In some embodiments, the local computing device 108 may be in operable communication (by wired connection or wirelessly connected) with at least one of a scanning device 110. The scanning device 110 may be a high-speed scanner, configured to scan and process ballots efficiently in cooperation with the local computing device 108 and the computing device 104 as described herein. In one embodiment, the scanning device 110 may include, e.g., an ImageTrac Intelligent Production Scanner by IBML or other similar device. The scanning device 110 may be configured with high-volume scanning features such as multiple sort pockets, auto batching, pocket water falling, mixed document scanning, multi-feed detection, high capacity full page pockets, mechanical skew detection and correction, and other such features to accommodate the efficient scanning of large sets of ballot documents or other such documents associated with elections services. In some embodiments, the scanning device 110 may include any device equipped with a camera or other image capture technology and capable of generating image data or digital images from an elections document, such as a ballot.

In addition, the application 102 may have access to or be in operable communication with a SQL database 115. The SQL database 115 may store metadata associated with operations of the application 102, such a queries, and historical data. The SQL database 115 may further store and retrieve data requested by the application 102, and store information about users of the application 102.

Further, at least some features of the application 102 may be made available to a plurality of user devices 120 in communication with the computing device 104 of the system 100 and/or the local computing device 108 via the network 106. The plurality of user devices 120 may include, without limitation, a controller, a personal computer, a terminal, a workstation, a portable computer, a mobile device, a tablet, a phone, a pager, and a multimedia console. The plurality of user devices 120 may be accessible to or associated with administrators, elections officials, or other such users. In some embodiments, the plurality of user devices 120 or the local computing device 108 may access or otherwise interact with aspects of the application 102 via a portal (not shown) or by using an API (not shown).

Further still, the system 100 may include a printing apparatus 122 which may include at least a ballot printer. In some embodiments, the computing device 104 generates print instructions for the printing apparatus 122 to print duplicate ballots to replace original ballots that cannot be processed or tabulated as described herein. Aspects of the application 102 may be executed by the computing device 104, any number of processors or any number of computing devices (not shown) associated with the printing apparatus 122, so that the printing apparatus 122 may receive print instructions, access information from the application 102, or otherwise. In addition, the system 100 may include at least one tabulator 125 or other such device configured to interpret marks of a ballot printed from the printing apparatus 122 or otherwise accessed.

Figure 1B:
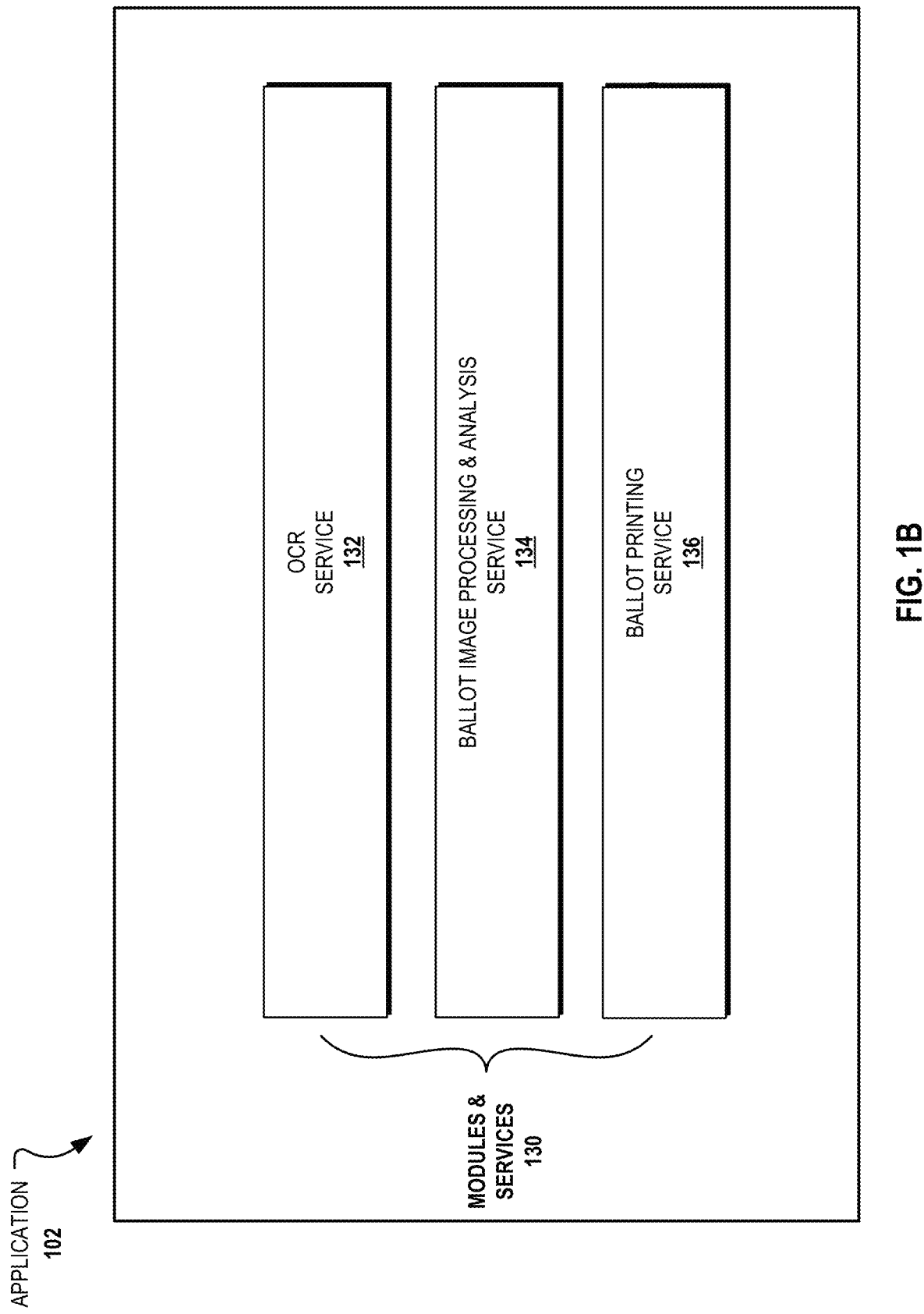
FIG. 1B is an application stack illustrating possible modules and associated processes of an application deployed with the computer-implemented system of FIG. 1A for ballot duplication and otherwise revising ballots for further processing.

Referring to FIG. 1B, the application 102 may define a plurality of different modules and/or services 130 as shown, and other associated or processes. For example, the application 102 may define at least an OCR service 132 for analyzing data of a scanned ballot image to retrieve a ballot style or to interpret language along the scanned ballot image. The application 102 may further define a ballot image processing and analysis service 134 for managing mark interpretation and modification thereof associated with a ballot. The application 102 may further define a ballot printing service 136 for generating print instructions and managing the printing of a ballot (using a revised ballot image or otherwise), as further described herein.

In general, the system 100 is generally configured to generate a duplicate image of a scanned original ballot that can be printed and properly tabulated in the case where the original ballot cannot be tabulated for whatever reason. These features directly address the technical issue where an original physical ballot has marks applied to it that are not discernable or are otherwise incapable of being read by a tabulator or other device that is configured to interpret and process the ballot. Aspects of the system 100 may be implemented or accessed by devices equipped at the voting location. In some embodiments, for example, the local computing device 108 may involve check-in equipment comprising any number of devices suitable for receiving or accessing voter information and selections from a voter. A network connection or other communication channel may be established via the network 106 between the local computing device 108 and the computing device 104. In some embodiments, a router (not shown) may also be deployed to provide fail-over connections between the computing device 104 (and the application 102) and the local computing device 108.

Figure 2:
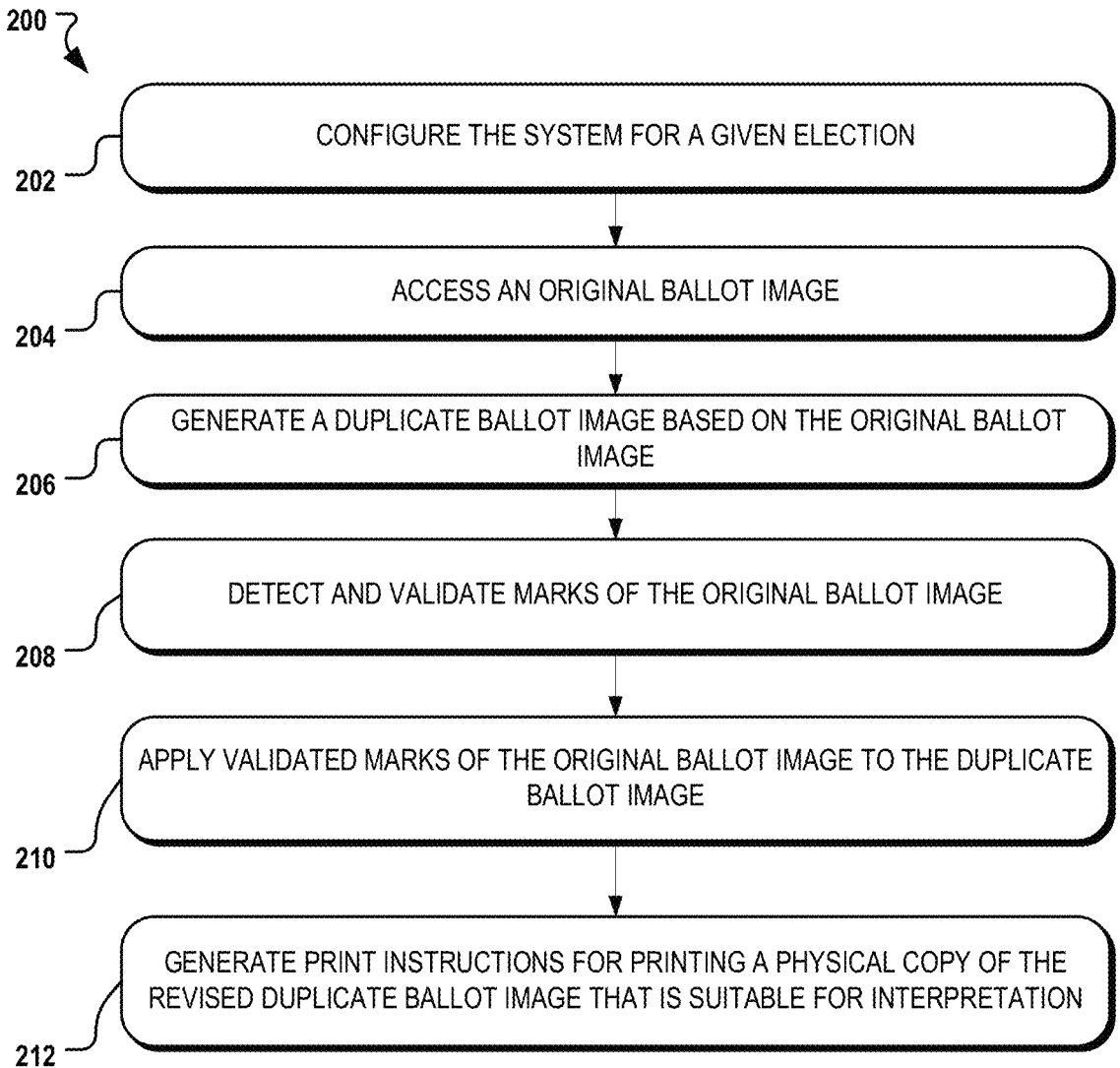
FIG. 2 is a simplified block diagram of a flow chart showing an exemplary process flow for on-screen ballot duplication and processing.

Referring to FIG. 2 and the process flow 200, further details of the computing device 104, the application 102, and the system 100 shall now be described. When accessing or configured with aspects of the application 102, the computing device 104 provides a graphical user interface (GUI) 400 shown in FIGS. 4A-4F, which accommodates further configurations to the computing device 104 to prepare ballot processing for a particular election. This step may involve configuring certain parameters for ballots to be scanned via the GUI 400, and specifying one or more "styles" as discussed herein for processing each ballot. In particular, referring to block 202 of FIG. 2, an "Election" may be generated (FIG. 4A), which may be defined by one or more objects or files associated with the application 102. The Election may be assigned a name or other identifier, may be associated with a password, and may reference or define a particular ballot style or ballot template.

In some embodiments, the Election may include or be configured with one or more of a particular ballot style. Ballot styles may be imported or specially created for the Election, and may be associated with different or unique jurisdictions or party affiliations; e.g., a first county may utilize a first ballot style, and a second county may utilize a second ballot style. As such, an Election may utilize a plurality of ballot styles to accommodate different ballot formats for different jurisdictions or sub-jurisdictions. Ballot styles may define where certain fields or voting positions are located and aligned along each ballot of the Election. In other words, an exemplary ballot style may generally comprise a template that defines where the different voting positions and fields are organized along a given ballot that uses or relates to that exemplary ballot style.

Figure 3A:
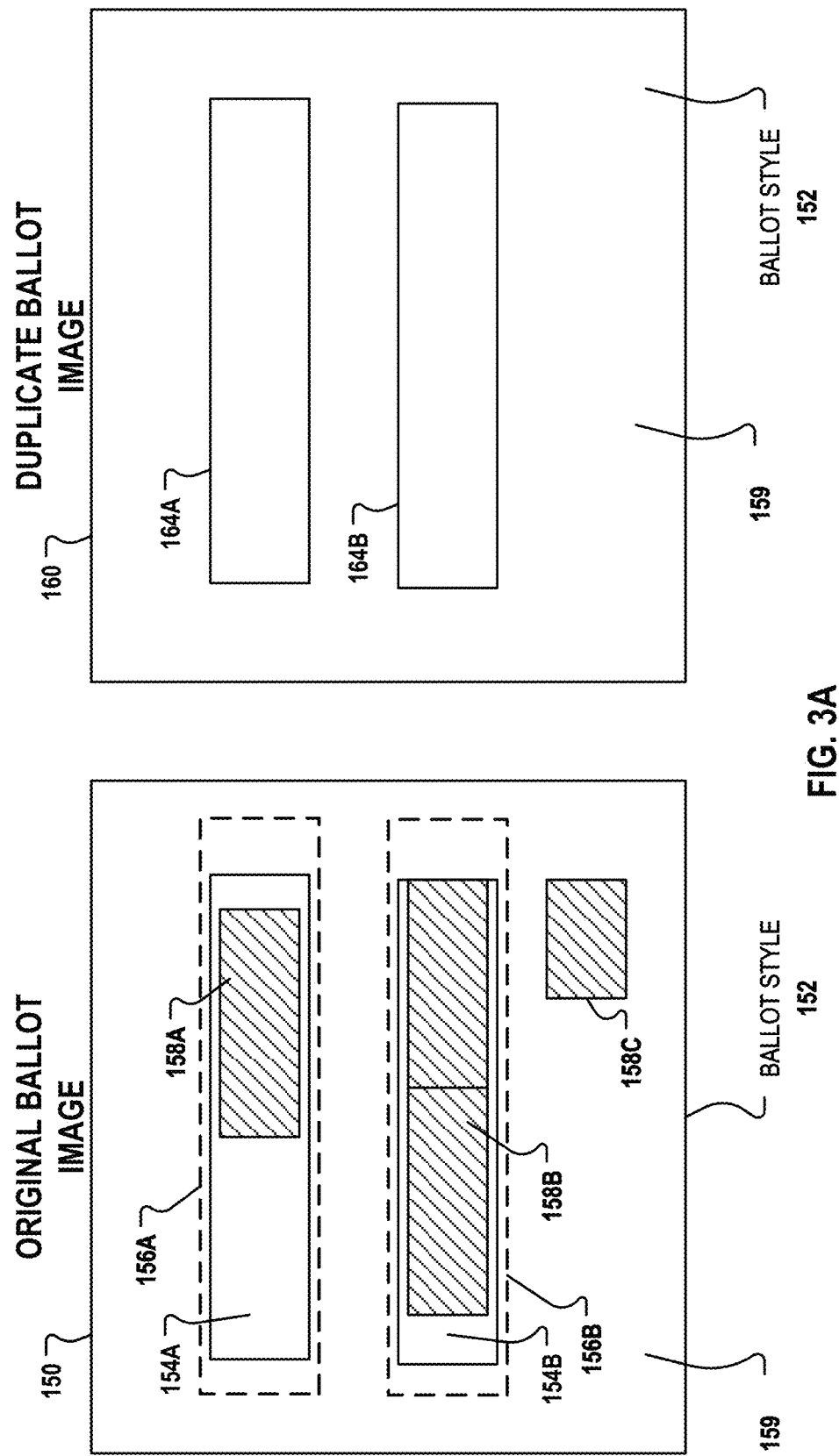
Figure 4A:
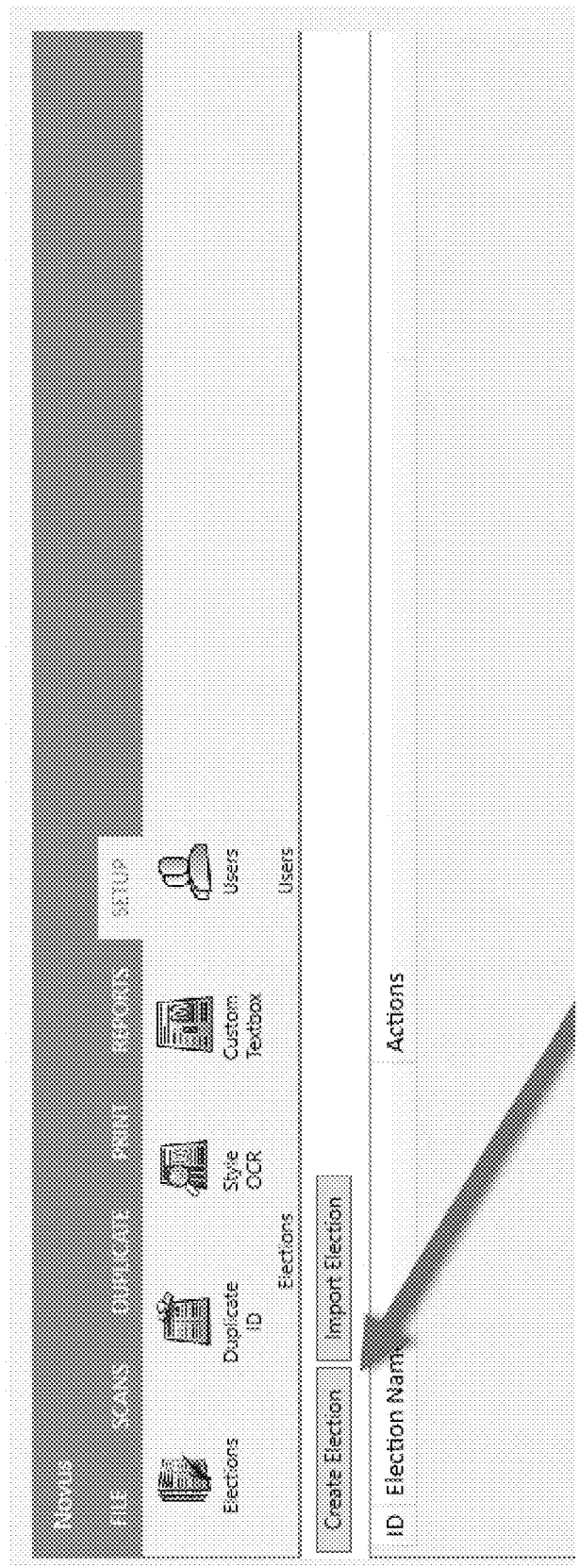
Figure 4B:
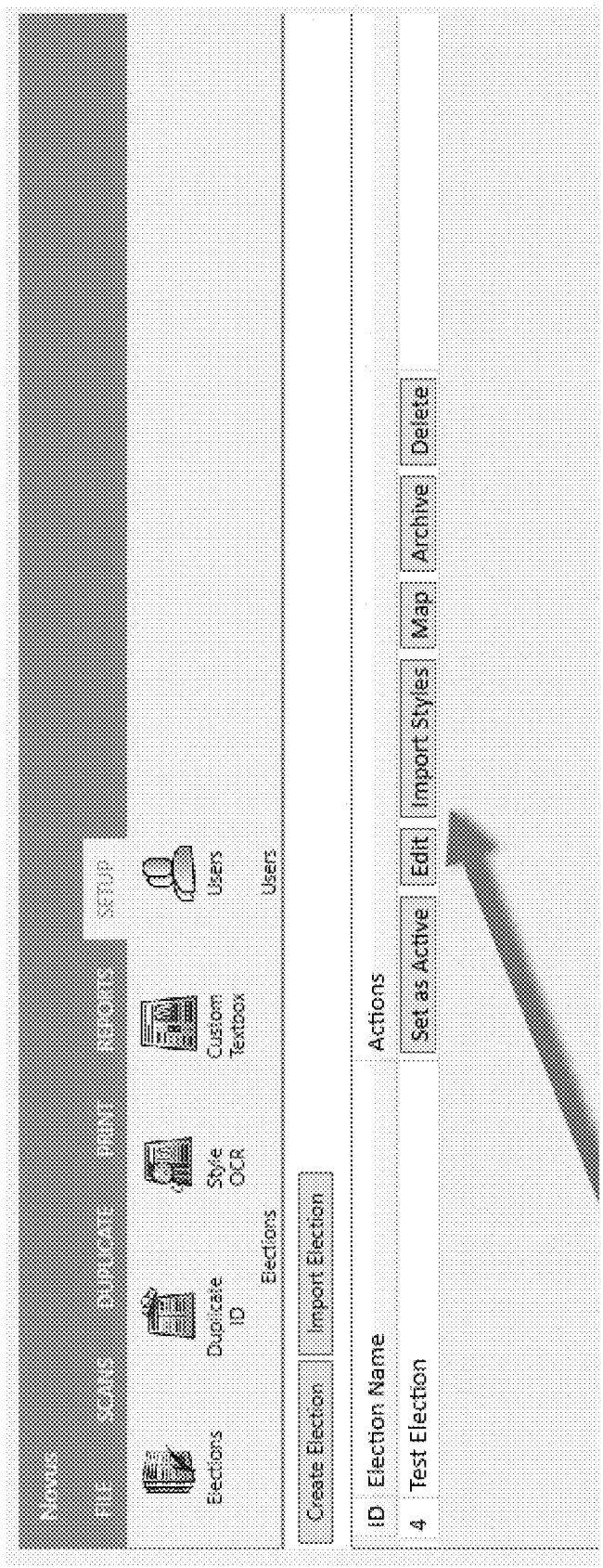
Figure 4C:
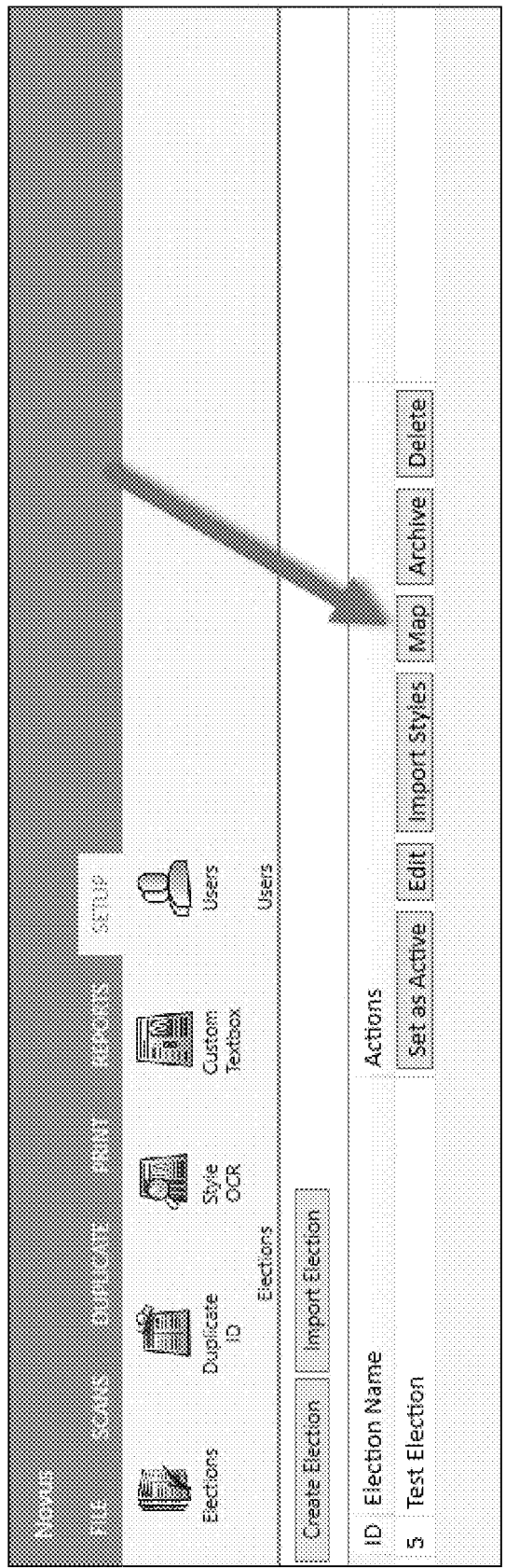

In some embodiments, the computing device 104 is operable to import or access a ballot style (FIG. 4B), and map the voting positions and other fields of the ballot style (FIG. 4C). Mapping may include identifying specific (x, y) pixel regions, or a set of pixel values defining one or more areas of interest (for example, a first field 154A and second field 154B of FIG. 3A), that correspond with particular voting positions or fields defined by the ballot style so that when a ballot is scanned or a ballot image is accessed, the computing device 104 is capable of identifying and interpreting locations along the ballot image where the voting positions and fields of the ballot are defined. An area of interest may include a bubble, space, or any other area where a mark is typically applied to a ballot. For the Election, the system 100 may examine each ballot style template used and map the fields and/or voting positions defined by each style as well as identifying and flagging the front and back images for the ballots. Mapping can be reviewed and edited by an administrator as desired. For example, when creating the Election, a user or reviewer may be provided with a general base ballot style template, and the user may create a graphical text box to form customized fields or areas of interest positioned along a ballot style which may then reference the locations of voting positions and other fields.

Figure 4E:
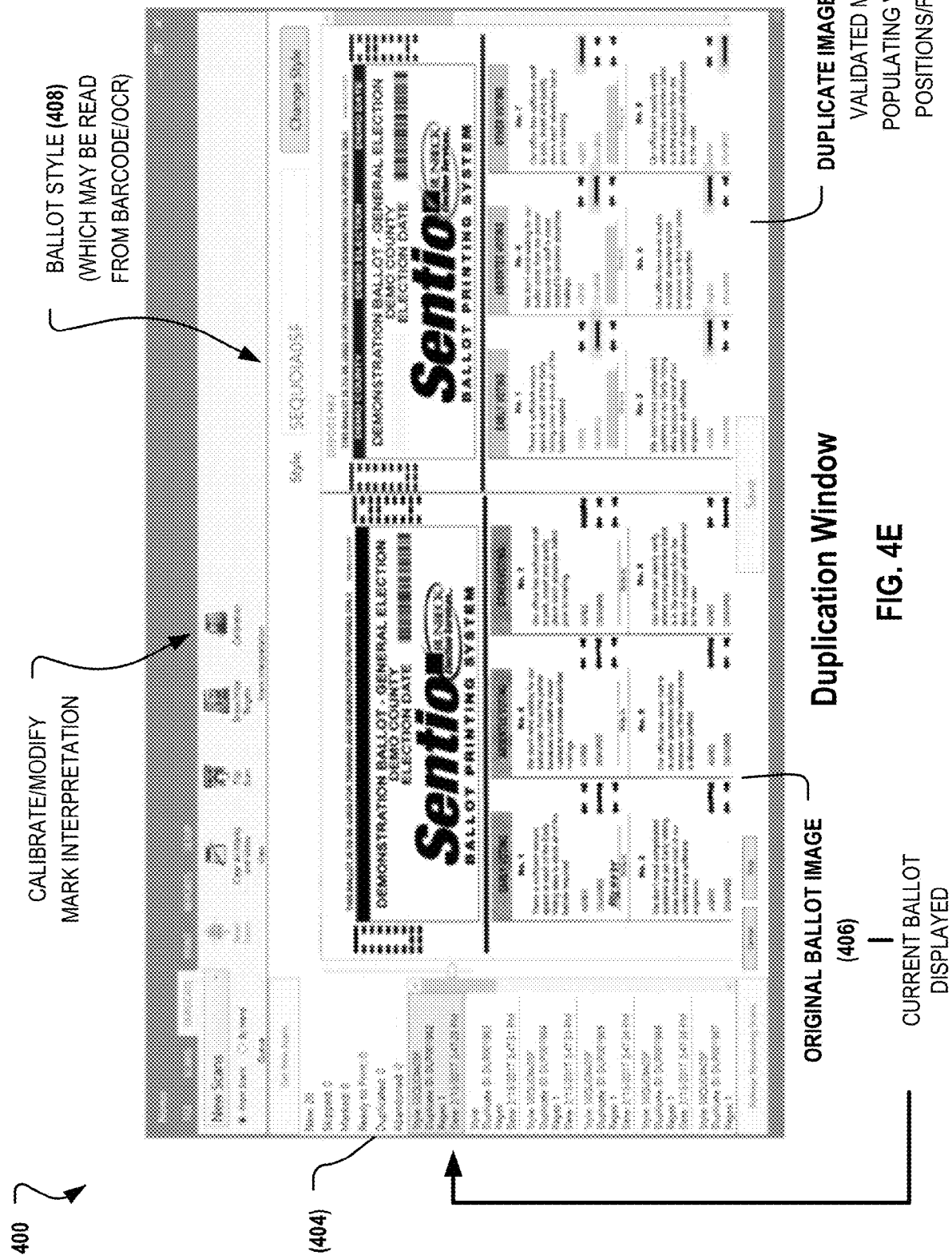

During configuration of the Election, the computing device 104 is further configured to define and manage a Duplicate ID (shown as Duplicate ID 159 in FIG. 3A and shown as 402 in FIGS. 4D-4E). In some embodiments, the Duplicate ID is an identifier assigned to every scan of an original ballot that is accessed by the computing device 104 for on-screen duplication, and links an original ballot image with a corresponding duplicate image (each of the original ballot image and the duplicate image later generated references the same Duplicate ID). The Duplicate ID can be adjusted in color, size, font, and placement, and an automatic Duplicate ID may be generated or a manual Duplicate ID can be created so desired. As described herein, the Duplicate ID may be assigned (in a file header, metadata, or otherwise referenced) to or visually rendered along an original ballot image of an original ballot that needs duplication as the ballot it is scanned, and the same Duplicate ID may be assigned (in a file header, metadata, or otherwise referenced) to or visually rendered along a duplicate ballot image to ensure the two ballot images (original ballot image and the duplicate image) are always "tied" together in the event of future review. Duplicate IDs can be used in coordination with local elections rules and regulations.

In some embodiments, the Duplicate ID may be rendered along the top left of a ballot image, but the Duplicate ID may be modified or moved to a different position along an image as desired. Further, the data of the Duplicate ID may be assigned manually or automatically. For example, each ballot may automatically be assigned a Duplicate ID with an auto-incrementing number, requiring no action by the reviewer, and the ID may be predicated with the Username and a number (i.e., DupBoard00001).

As indicated in FIG. 4F, mark interpretation may be calibrated or configured for the Election via the GUI 400 or otherwise. Mark interpretation generally involves graphical processing of the areas of interest defining voting positions and other fields of a scanned ballot image; and generally e.g., assists to determine if a voter has placed a mark in a proper field or voting position, and properly executed the mark according to predetermined rules such that the mark can later be established as a valid mark, as further described herein. For example, if the computing device 104 detects a mark in a voting position of an original ballot image, a mark may be placed and recorded in the same voting position along a corresponding duplicate ballot image, and this mark may be highlighted to notify the reviewer of a potential vote. Utilizing the GUI 400 shown in FIG. 4E, the reviewer can accept/leave the mark or identify the mark as a valid mark, or click on it to remove the mark.

In some embodiments, for mark detection and interpretation by the computing device 104, a user may customize one or more detection parameters (454 and 456 in FIG. 4F) which may define a graphical indicator configuration (458 and 460 in FIG. 4F) for analyzing the area of interest along a ballot image for potential valid voter marks, and the user may set rules for interpreting marks. More specifically for example, in some embodiments, a user may configure the Election to define a predetermined number of a plurality of graphical indicators that may be aligned in a predetermined position/pattern along areas of interest of a ballot image. The graphical indicators may comprise solid identifiable shapes such as dots that may be rendered along a scanned ballot image; and in particular, may be rendered along specific predefined pixel regions of a display such that the graphical indicators are viewable via the GUI 400 along portions of the image. In some embodiments, the graphical indicators may be defined along the areas of interest of the ballot image to identify required graphical areas where a voter's mark must pass through on the original ballot image 150 to be automatically interpreted as a vote. For example, a predetermined plurality of graphical indicators may be defined along one or more areas of interest of a ballot style. Then, a rule may be set by the user that a mark is not considered to be valid or otherwise needs to be reviewed where the mark fails to occupy or pass over each of the graphical indicators, as further described herein. The computing device 104 may be configured to apply the rules associated with the graphical indicators to suggest to a user engaging the GUI 400 to apply a mark in a field of a duplicate image (or not) by weighing the properties of the mark (position, size, and color) relative to the graphical indicators and configurations thereof.

The calibration of the plurality of indicators and/or mark interpretation can be adjusted when and as desired. In some embodiments, during processing, the computing device 104 identifies marks of a voter from the original ballot image, looking only in the areas of interest/voting positions, and adds marks on a corresponding duplicated ballot image automatically. In some embodiments, the graphical indicators may be spread out evenly within the areas of interest but keeping distance from adjacent voting position outlines (oval, square, arrow) because the dark area of the voting positions can be picked up as a mark. Different possible non-limiting configurations or parameters associated with the indicators for mark interpretation are further provided in Table 1.

TABLE 1

Horizontal Offset - The higher the number, the further the cluster of dots moves to the Right.
Vertical offset - The highter the negative number the Higher the cluster of dots are on this page.
Horizontal Spaclng - Determines the spacing of the targets from each other
from left to right
Vertical Spacing - Determines the spacing of targets from each other up and down.
Minimum Hits: A number from 0 to 6. This is the number of targets (red dots) that must be impacted by a mark for Novus to replicate on the duplicate. For Example: If the Minimum Hits is set to 3, then a dark mark only needs to intersect 3 of the red dots for Novus to suggest a vote on the
Duplicate.

Referring to blocks 204 and 206 of FIG. 2, once the Election is sufficiently configured with e.g., the designated ballot style and the desired mark interpretation, etc., the computing device 104 may then begin accessing and duplicating individual original ballot images. Original ballot images may be accessed from pre-scanned image data remotely or via a storage device, or may be generated using the scanning device 110 and may be accessed by the computing device 104 in batches and stored in a folder specific to the Election created above. Further, each original ballot image may be placed into a queue (404 in FIG. 4E), which may accessed by a user as desired. One example of an original ballot image is original ballot image 406 selected from queue 406 and displayed along the GUI 400 in FIG. 4E. As indicated, this original ballot image 406 defines a ballot style 408, which may be identified during OCR applied to the corresponding original physical ballot, or by a barcode reader. As further shown in FIG. 4E, a duplicate image 410 may be generated and displayed via the GUI 400 next to the original ballot image 406. The duplicate image 410 may include the same ballot style 408 such that the format of fields and voting positions matches the fields and voting positions of the original ballot image 406.

Figure 3B:
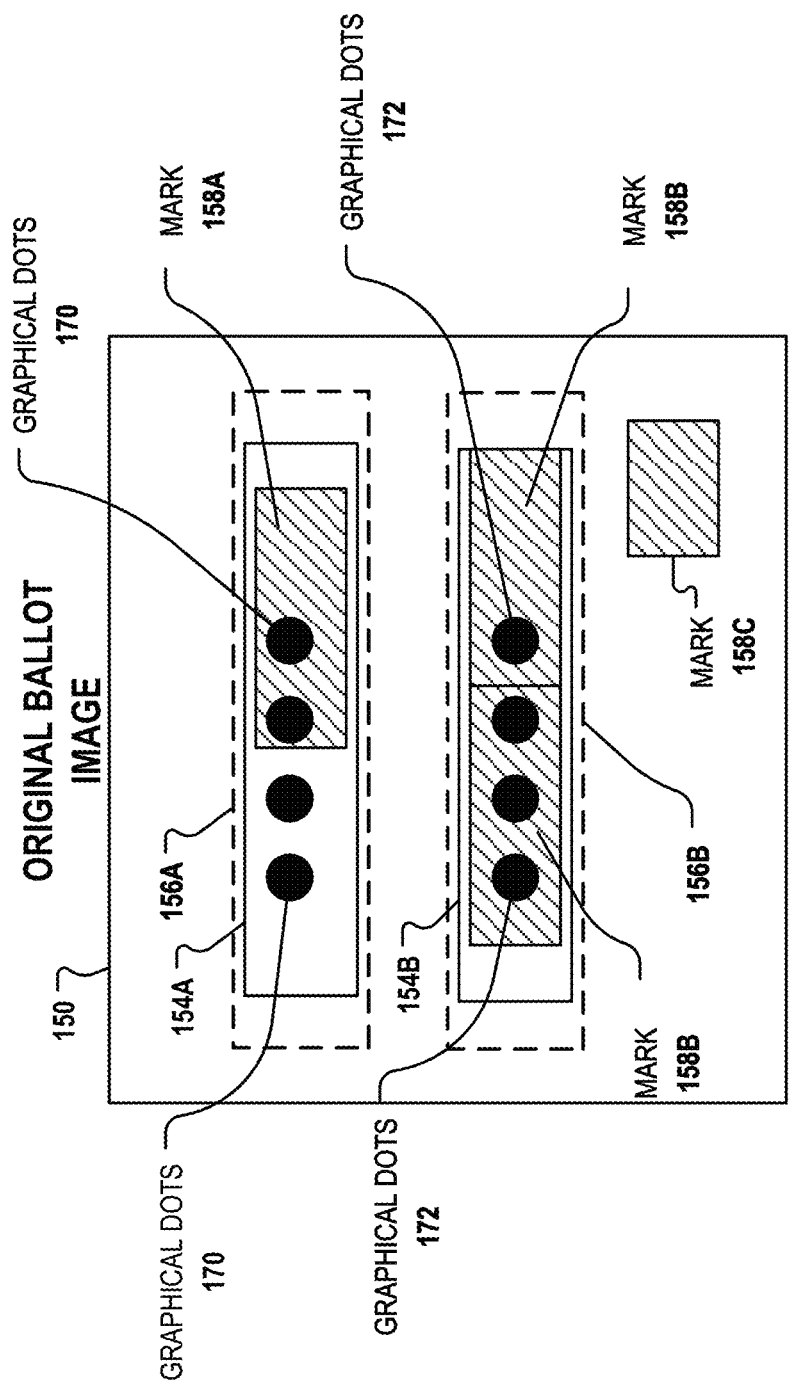

Further details regarding the image duplication of FIG. 4E are illustrated in FIGS. 3A and 3B. Referring to FIG. 3A, an original ballot image 150 may be accessed by the computing device 104 and displayed along the display 105. The original ballot image 150 may be a scanned image of an original, physical ballot (not shown) that is configured with a ballot style 152 that needs to be duplicated and/or edited for whatever reason in order for the votes of the original ballot to be properly processed or interpreted by a tabulator. In the example shown, the ballot style 152 defines a first field 154A and a second field 154B, such that the original ballot image 150 and the original ballot both include the first field 154A and the second field 154B. It should be appreciated that the ballot style 152 may define any number of fields associated with voting positions or other data points. In some embodiments, Optical Character Recognition (OCR) may be employed in order to 'read' the original ballots to determine the ballot style 152. Fields are indicated in FIG. 4E as field "No. 1," field "No. 2", and so on, and are displayed identically along both of the original ballot image 406 and the duplicate image 408 because the images share the same ballot style 408.

As shown in FIG. 3A and FIG. 3B, an area of interest 156A and an area of interest 156B may be mapped for the ballot style 152 by the computing device 104 and rendered along the display 105 over the original ballot image 150. In this example, the area of interest 156A may be associated with the first field 154A, and the area of interest 156B may be associated with the second field 154B. In some embodiments, the area of interest 156A and the area of interest 156B may define respective predetermined sets of pixel values or respective pixel regions along the display 105 defining specification locations where the computing device 104 has been configured, during mapping, to detect the first field 154A and the second field 154B, based on the format and layout of the ballot style 152.

As further shown, the original ballot image 150 may include several marks 158, designated mark 158A, mark 158B, and mark 158C. The marks 158 may correspond to physical markings applied to the corresponding original ballot by a voter using a pen or other instrument that are scanned during creation of the original ballot image 150 from the corresponding original physical ballot (not shown). As further described herein, any of the marks 158 may be intended to apply a vote and may be sufficient for populating a voting position or field, may be ineligible, illegible, or otherwise insufficient for interpretation by a tabulator. In some cases, one or more of the marks 158 may be inadvertently scanned or created by the voter.

In some embodiments, the original ballot image 150 may be assigned a Duplicate ID 159. The Duplicate ID 159 may be rendered along the original ballot image 150, or may be tracked or defined within metadata of a digital file storing the original ballot image 150. The value of the Duplicate ID 159 and format may be customized as desired to conform to local elections rules or regulations. The Duplicate ID 159 is unique to the original ballot scanned to create the original ballot image 150, and may be replicated to any duplicate ballot images based on the original ballot image 150.

Referring to block 206 of FIG. 2, FIG. 3A, and FIG. 4E, a duplicate ballot image 160 may be generated and also rendered side-by-side along the display 105 by the computing device 104. By referencing the ballot style 152, the computing device 104 is operable to generate the duplicate ballot image 160 to include the same layout of fields and voting positions as the original ballot image 150. Accordingly as indicated, the duplicate ballot image 160 may include a first field 164A corresponding to the first field 154A of the original ballot image 150, and the duplicate ballot image 160 may also include a second field 164B corresponding to the second field 154B of the original ballot image 150 in the same orientation, location, and format as the original ballot image 150. In some embodiments, the duplicate ballot image 160 can be formed to generally resemble a blank copy of the original ballot image 150; i.e., the first field 164A and the second field 164B of the duplicate ballot image 160 may be blank, empty, or unpopulated as shown, until the marks 158 of the original ballot image 150 can be analyzed and validated as further described herein.

Referring to blocks 208 and 210 of FIG. 2 and FIG. 3B, in some embodiments, the marks 158 of the original ballot image 150 may be analyzed using OCR or otherwise to determine the size, characteristics, and position of the marks 158 relative to the areas of interest 156A and 156B, in order to ascertain whether any of the marks 158 sufficiently cover a predetermined required amount of physical space along the first field 154A or the second field 154B, or otherwise satisfy predefined rules such that the mark 158 may be deemed to reflect a valid mark and vote for either field which may be interpreted by a tabulator or other vote tallying device. More specifically, each of the marks 158 may define respective sets of pixel values or pixel regions along the display 105. The mark 158A may define a first set of pixel values that overlaps or at least partially passes through the region of interest 156A, and the mark 158B may define a second set of pixel values that overlaps or at least partially passes through the region of interest 156B. In addition, the mark 158C may define a third set of pixel values that falls outside both of the areas of interest 156A and 156B. In the example shown, the mark 158C indicates a possible erroneous mark that may be omitted from the duplicate ballot image 160 to decrease the likelihood of an erroneous reading of a printed version of the duplicate ballot image 160 during tabulation. Leveraging OCR or other such functionality, the computing device 104 is operable to identify the marks 158 including any of the marks 158 such as the mark 158C that are outside any of the fields of the original ballot image 150, and those marks may be removed from the duplicate ballot image 160 so that a new ballot printed from the duplicate ballot image 160 does not contain any misplaced marks that may affect interpretation of the original ballot by a tabulator.

The mark 158A and the mark 158B may be further processed in view of a plurality of indicators 170 to determine whether either of these marks 158 are valid or should be modified in the duplicate ballot image 160 to accommodate accurate vote tallying. As previously described, in some embodiments, a plurality of graphical indicators such as dots or other predetermined shapes may be pre-calibrated and defined for each of the areas of interest 156A and 156B, in any manner described in Table 1 above or otherwise. For example, as indicated in FIG. 4F, arrangement of the graphical indicators relative to the areas of interest may be defined using detection parameters 454 for a first example 450, and detection parameters 456 for a second sample 452. The detection parameters 454 may define a graphical indicator configuration 458 that renders graphical indicators along a left side of a field of interest (bubble shape for receiving a mark). Alternatively, the detection parameters 456 may define a graphical indicator configuration 458 that renders graphical indicators along a centermost area of an area of interest (bubble shape for receiving a mark). Many different varieties of graphical indicator configurations are contemplated.

Continuing the example shown in FIG. 3B, a plurality of indicators 170 may be defined within the area of interest 156A, and a plurality of indicators 172 may be defined within the area of interest 156B. Each of the plurality of indicators 170 and the plurality of indicators 172 may be rendered over the original ballot image 150 along the display 105 as shown (or may be compared non-visually with the areas of interest by the computing device 104), and may be useful for determining or at least indicating whether a particular field/area of interest defines a mark that is considered to be "valid" or indicative of a vote, and/or needs to be modified in some form. A mark occupying a region of interest may be deemed to be valid or indicative of a vote based on any number of predefined rules. For example, in some embodiments, where a mark overlaps all of the plurality of indicators defined within an area of interest, the mark may be deemed to be sufficient for being interpreted by a tabulator or other ballot processing device, such that the mark can simply be duplicated in the form depicted along the original ballot image to a corresponding duplicate image. Conversely, a mark that occupies at least a portion of an area of interest but fails to cover or overlap all associated graphical indicators may be deemed to be invalid and may need to be modified within the corresponding duplicate ballot image to fill a sufficient amount of space, or omitted. In some embodiments, a threshold may be set for a minimum number of indicators a mark must occupy in an area of interest of an original ballot image to reflect a vote (which may be applied to a duplicate image of the original ballot image). In some embodiments, the marks may define color elements corresponding to the pixel regions occupied by the marks, and values of these color elements may be detected by the computing device 104 which may further be used to determine whether a mark is a "valid" mark.

Referring to the example of FIG. 3B, the mark 158A occupies at least a portion of the area of interest 156A, and covers, intersects, or overlaps at least a portion of the plurality of graphical indicators 170, but does not cover all of them. Depending upon the rules created by an administrator, this may indicate a valid mark, or may not. On the other hand, the mark 158B covers, intersects, or overlaps all of the graphical indicators 172 of the area of interest 156B, which may indicate that the mark 158B reflects a valid mark for a vote in the second field 154B.

Referring to FIG. 3C, and based on the mark detection and interpretation depicted in FIG. 3B, the duplicate ballot image 160 may be populated with markings or otherwise modified. For example, marks 158 identified along the fields of the original ballot image 150 as "valid" may be duplicated in some form along the corresponding areas of the duplicate ballot image 160 (field 164A and field 164B) as mark 188A and mark 188B. Any of these marks applied to the duplicate ballot image 160 may be analyzed further and modified to optimize processing (e.g., increased in size to increase the likelihood of interpretation), and then verified. In other words, the mark 188A and the mark 188B can be configured in size and format to ensure proper interpretation by a tabulator so that voter intent of the original ballot can be realized—the duplicate ballot image 160 can be printed to form a new physical ballot (not shown) in a tabulation-ready format and the votes can be processed as intended by the voter. Any such printed version of the duplicate ballot image 160 includes the duplicate fields (field 164A and field 164B) corresponding to the fields of the original ballot image 150, the same Duplicate ID 159, and the same ballot style 152. In the example shown, the mark 158A and mark 158B of the original ballot image 150 are determined to be valid marks or occupy sufficient space within respective fields of the original ballot image 150 to indicate votes for those fields. Accordingly, the new marks 188A and 188B of the duplicate ballot image 160 may be generated to cover the first field 164A and second field 164B, respectively, in a manner which is more likely to be properly interpreted by a tabulator or other device used to interpret the votes deemed to be reflected by the duplicate ballot image 160. In addition, as indicated, the mark 158C of the original ballot image 150 may be omitted from the duplicate ballot image 160 and/or any printed version of the same.

All ballot markings and actions may be taken as viewed on-screen along the display 105 and stored on a user log. Review after duplication may be available to administrators and can take place before printing. When the duplicate ballot image 160 is ready to be printed, as reflected in block 210 of FIG. 2, a file containing all ballots for duplication can be printed directly to a connected ballot printer such as the printing apparatus 122, or exported to be printed through another source. For procedures that require further final review, duplicate ballots may include "Duplicate ID" to distinguish such ballots from the original and a report of user activity may be generated for auditing and any other county specific procedures.

In some embodiments, modification of the marks along the duplicate ballot image 160 may involve close comparison with the marks along the original ballot image 150 to identify voter intent. In some embodiments, a reviewer of the original ballot image 150 and the duplicate ballot image 160 may manually review and edit marks, e.g., remove all marks from the duplicate ballot image 160 with a single click of a tab. In some embodiments, the entire scanned image may be rotated as desired.

Figure 5:
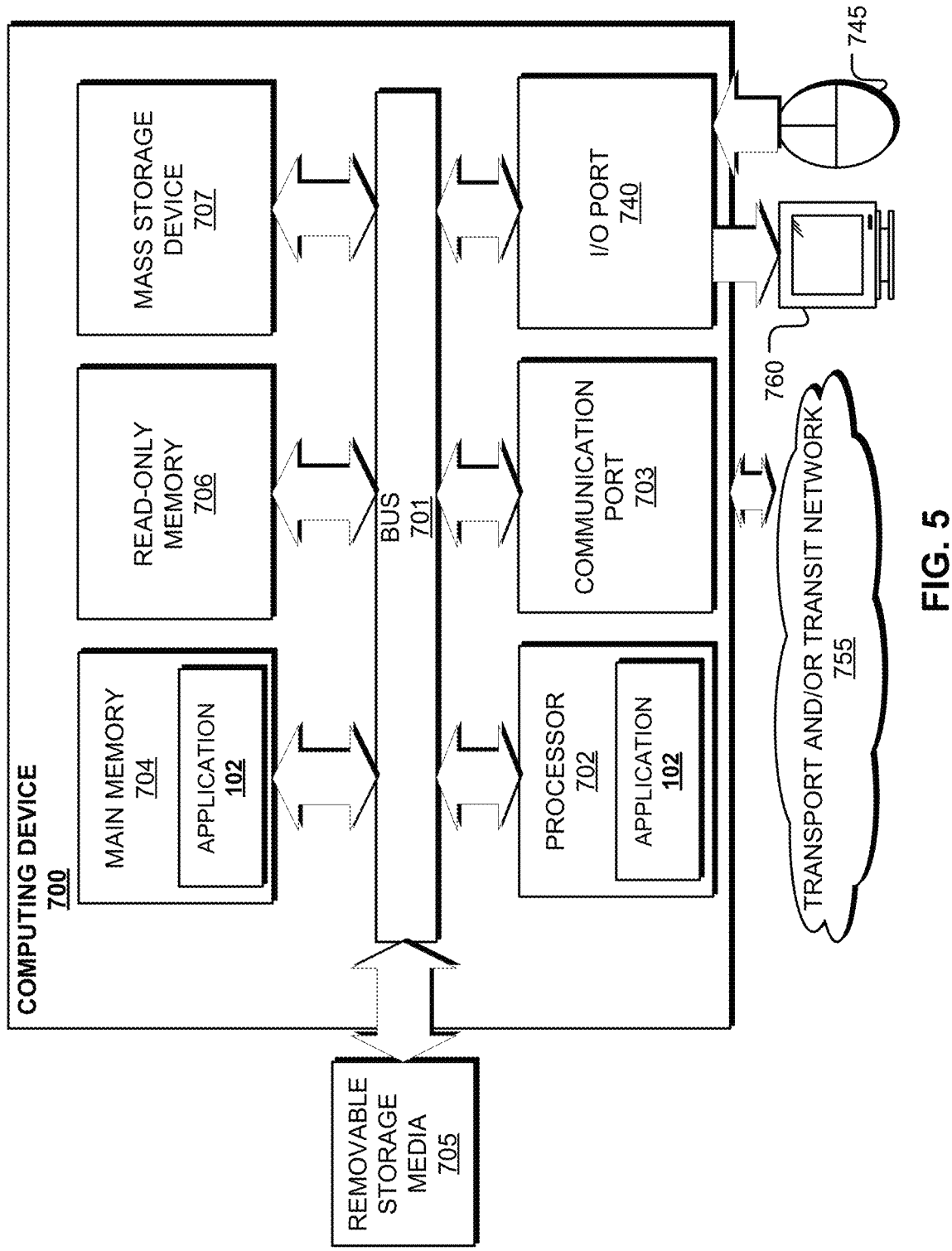
FIG. 5 is a simplified block diagram showing an example of a computing system that may implement various services, systems, and methods discussed herein.

FIG. 5 is an example schematic diagram of a computing device 700 that may implement various methodologies discussed herein. For example, the computing device 700 may comprise the local computing device 108 or the computing device 104 executing or accessing functionality and/or aspects of the application 102. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 102 that supports functionality discussed above. In other words, aspects of the application 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the application 102 stored in main memory or otherwise tangibly stored.

Figure 6:
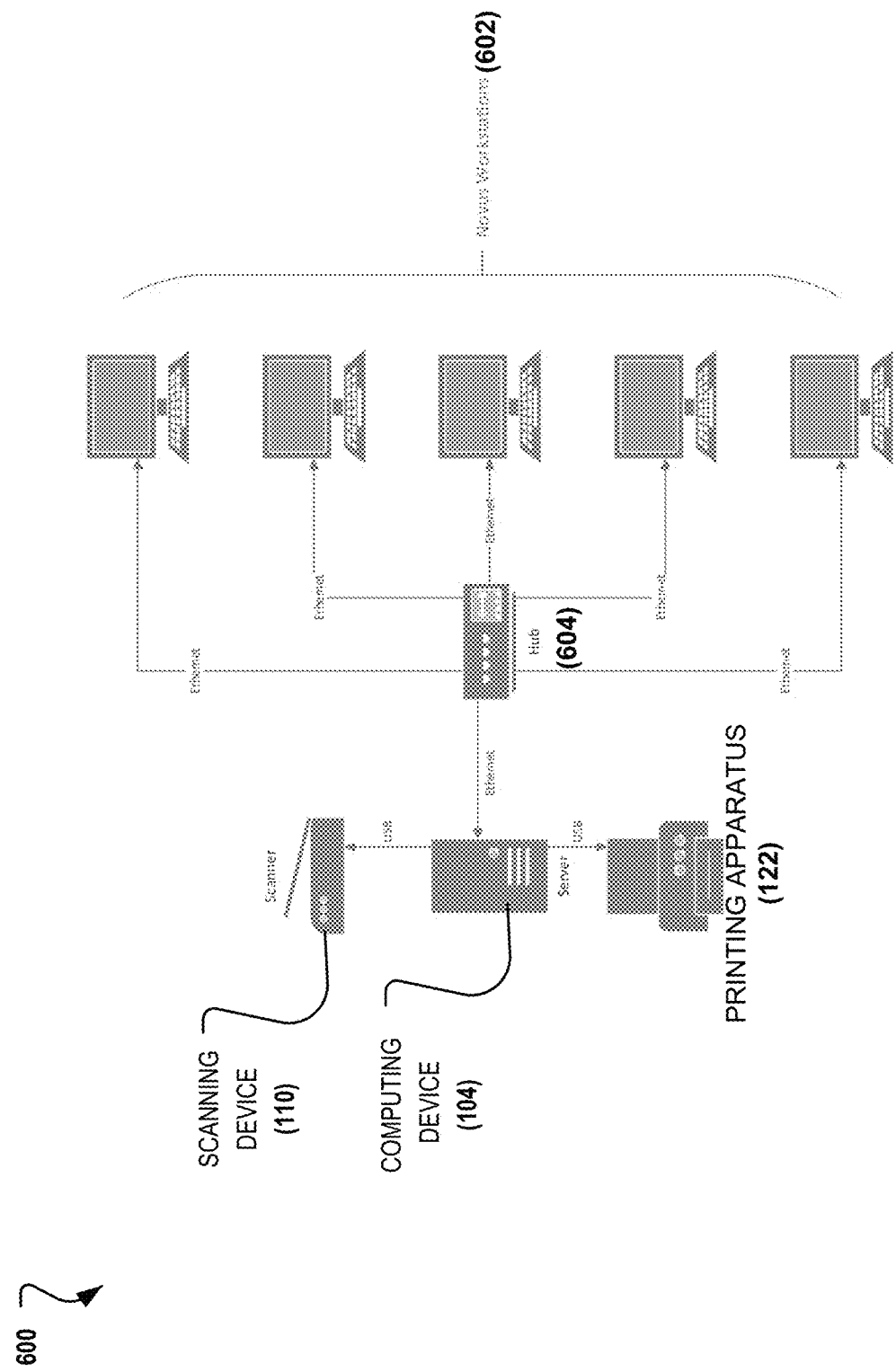
FIG. 6 is an image illustrating an exemplary network configuration for implementing the features discussed herein.

Referring to FIG. 6, an exemplary network configuration 600 is shown which may be deployed to implement aspects of the system 100. As indicated, the network configuration 600 may include the printing apparatus 122, a computing device 104 such a server, and a scanning device 110. In addition, the network configuration 600 may include a plurality of workstations 602 in operable communication with the printing apparatus 122, computing device 104 scanning device 110 via a hub/router 604. The work stations 602 may include desktop computers, laptops, or other such devices accessing or configured with aspects of the application 102 (e.g., may define client-side devices). In some cases, the workstations 602 may access aspects of the application 102 as software as a service (SaaS).

In some embodiments, the system 100 may be used in a standalone, single-station environment with no networking to external devices/environments to preserve security. At least some installations may include a scanner and printer connected to a server via USB, and one or more workstations as shown that are connected with the server to a hub. Additional networking components are contemplated.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method implemented by a computing device, comprising:
    accessing an original ballot image associated with an original ballot;
    mapping a plurality of areas of interest of the original ballot image based on a ballot style associated with the original ballot, a first area of interest of the plurality of areas of interest corresponding to a portion of the original ballot that is uninterpretable by a tabulator for elections processing;
    identifying a first mark from a first set of marks applied to the original ballot, the first mark defined along the first area of interest and overlapping a predetermined number of graphical indicators associated with the first area of interest;
    generating a duplicate ballot image from the original ballot image, the duplicate ballot image defining the same plurality of areas of interest of the original ballot image and the ballot style;
    rendering the original ballot image alongside the duplicate ballot image via a display; and
    suggesting, via the display, an application of a replacement mark along the first area of interest of the duplicate ballot image such that the duplicate ballot image printed with the replacement mark is interpretable by the tabulator.

2. The method of claim 1, further comprising:
    generating the replacement mark along a voting position corresponding to the first area of interest, the replacement mark being modified from the first mark to increase a likelihood of interpretation by the tabulator.

3. The method of claim 1, further comprising:
    applying optical character recognition to identify a mark outside the areas of interest of the original ballot image; and
    removing the mark from the duplicate ballot image.

4. The method of claim 1, wherein the first set of marks of the original ballot are highlighted along the display.

5. The method of claim 1, further comprising rendering a common duplication identifier along the original ballot, the original ballot image, and the duplicate ballot image.

6. The method of claim 1, further comprising accessing the original ballot image from a ballot repository associated with an elections office.

7. The method of claim 1, further comprising generating a print file from the duplicate ballot image that defines a set of print instructions for generating a new ballot that satisfies predetermined mark rules and reflects voter intent as defined by the first set of marks of the original ballot image.

8. The method of claim 1, further comprising customizing one or more detection parameters for analyzing an area of interest along the original ballot image.

9. The method of claim 1, further comprising employing Optical Character Recognition to read the original ballot to determine the ballot style.

10. A computer-implemented system for ballot processing, comprising:
   a display; and
   a computing device in operable communication with the display, the computing device configured to:
      access an original ballot image associated with an original ballot,
      map a plurality of areas of interest including a first area of interest of the plurality of areas of interest corresponding to a portion of the original ballot that is uninterpretable by a tabulator for elections processing,
      identify a first mark from a first set of marks applied to the original ballot, the first mark defined along the first area of interest and overlapping a predetermined number of graphical indicators associated with the first area of interest,
      generate a duplicate ballot image based on the original ballot image, the duplicate ballot image and the original ballot image defining common areas of interest, and
      configure marks of the duplicate ballot image to suggest at least one replacement mark along the first area of interest of the duplicate ballot image such that the duplicate ballot image printed with the replacement mark is interpretable by the tabulator.

11. The computer-implemented system of claim 10, wherein the computing device is further configured to utilize a predefined ballot style template to identify the common areas of interest.

12. The computer-implemented system of claim 10, wherein the tabulator is configured to interpret marks of the original ballot printed from a printing apparatus.

13. The computer-implemented system of claim 10, wherein the duplicate ballot image is assigned a unique Duplicate ID.

14. A method implemented by a computing device configured for interpreting ballot marks, comprising;

mapping a plurality of areas of interest including a first area of interest of the plurality of areas of interest defined along an original ballot image corresponding to a portion of an original ballot that is uninterpretable by a tabulator for elections processing;
   customizing a plurality of detection parameters operable to analyze the first area of interest for a valid voter mark;
   defining a plurality of graphical indicators aligned along the first area of interest of the original ballot image;
   rendering the plurality of graphical indicators over the original ballot image along a display to identify a first mark from a first set of marks applied to the original ballot, the first mark defined along the first area of interest and overlapping a predetermined number of the plurality of graphical indicators associated with the first area of interest; and
   measuring an amount that the first mark overlaps a portion of the plurality of graphical indicators within the first area of interest to validate the first mark and to suggest an application of a replacement mark along a corresponding first area of interest of a duplicate ballot image.

15. The method of claim 14, wherein the plurality of graphical indicators define predetermined shapes rendered along the original ballot image and associated with a particular pixel region along the original ballot image.

16. The method of claim 14, wherein the computing device identifies the first mark from the original ballot image and automatically adds a new mark on a corresponding duplicated ballot image.

17. The method of claim 14, wherein the plurality of graphical indicators is consistently spaced and does not overlap an adjacent voting position outline.

18. The method of claim 14, further comprising setting a threshold for a minimum number of graphical indicators the first mark must overlap in the area of interest of the original ballot image to reflect a vote.

19. The method of claim 14, wherein the first mark is determined to be valid if the first mark overlaps all of the plurality of graphical indicators in the area of interest.

20. The method of claim 14, wherein the first mark is determined to be invalid if the first mark occupies at least a portion of the plurality of graphical indicators in the area of interest but fails to overlap all of the plurality of graphical indicators in the area of interest.

* * * * *